United States Patent
Hsu

(10) Patent No.: US 9,684,783 B2
(45) Date of Patent: Jun. 20, 2017

(54) SELF-AUTHENTICATION DEVICE AND METHOD

(71) Applicant: FAST AND SAFE TECHNOLOGY PRIVATE LIMITED, Singapore (SG)

(72) Inventor: Hsiang Ke Desmond Hsu, Singapore (SG)

(73) Assignee: FAST AND SAFE TECHNOLOGY PRIVATE LIMITED, Singapore (SG)

( * ) Notice: Subject to any disclaimer, the term of this patent is extended or adjusted under 35 U.S.C. 154(b) by 91 days.

(21) Appl. No.: 14/891,538

(22) PCT Filed: May 16, 2014

(86) PCT No.: PCT/SG2014/000215
§ 371 (c)(1),
(2) Date: Nov. 16, 2015

(87) PCT Pub. No.: WO2014/185865
PCT Pub. Date: Nov. 20, 2014

(65) Prior Publication Data
US 2016/0103991 A1 Apr. 14, 2016

(30) Foreign Application Priority Data

May 16, 2013 (SG) .................................. 201303827

(51) Int. Cl.
| | |
|---|---|
| *H04L 29/06* | (2006.01) |
| *G06F 21/45* | (2013.01) |
| *G06F 21/34* | (2013.01) |
| *G06F 21/60* | (2013.01) |
| *H04L 9/08* | (2006.01) |
| *H04L 9/32* | (2006.01) |

(52) U.S. Cl.
CPC .............. *G06F 21/45* (2013.01); *G06F 21/34* (2013.01); *G06F 21/602* (2013.01); *H04L 9/0891* (2013.01); *H04L 9/3226* (2013.01); *H04L 9/3234* (2013.01); *H04L 63/083* (2013.01); *H04L 63/0853* (2013.01); *H04L 63/20* (2013.01); *H04L 2463/082* (2013.01)

(58) Field of Classification Search
CPC ........ G06F 21/45; G06F 21/34; G06F 21/602; H04L 9/0891; H04L 9/3226; H04L 9/3234; H04L 63/083; H04L 63/0853; H04L 63/20
See application file for complete search history.

(56) References Cited

U.S. PATENT DOCUMENTS

| | | | | |
|---|---|---|---|---|
| 2008/0263656 | A1 | 10/2008 | Kosaka | |
| 2014/0195441 | A1* | 7/2014 | Johnson | ............... G06Q 20/352 705/72 |
| 2017/0017810 | A1* | 1/2017 | Bolotin | .................. G06F 21/78 |

OTHER PUBLICATIONS

"Large Scale Password Management With Hitachi ID Password Manager" Hitachi ID Systems, Inc., Apr. 1, 2013 (Apr. 1, 2013).
(Continued)

*Primary Examiner* — Oleg Korsak
(74) *Attorney, Agent, or Firm* — Volpe and Koenig, P.C.

(57) ABSTRACT

A self-authentication device and method. The self-authentication device being for the user or owner of an electronic security device, wherein the self-authentication recovery device is separate from the security device and is configured for connecting to a computing device via a first communication link for authentication processing, preferably for authentication and recovery processing.

15 Claims, 6 Drawing Sheets

(56) References Cited

OTHER PUBLICATIONS

"Self-service Password Rest with Hitachi ID Password Manager" Hitachi ID Systems, Inc., May 9, 2013 (May 9, 2013), pp. 1-2, https:/web.archive.org/web/20130509024039/http://hitachi-id.com.

* cited by examiner a)

b)

a)

b)

SELF-AUTHENTICATION DEVICE AND METHOD

FIELD OF INVENTION

The present invention relates broadly to a system, device and method in the field of information technology (IT) security and electronic security.

BACKGROUND

In the context of IT security, many end user devices, including desktop computers, tablet computers, smartphones, laptop computers, portable hard disk drives, USB flash drives and various other mobile devices, as well as servers, process and exchange large amount of information in wired as well as wireless environments. Some of this information is highly sensitive, such as private personal information and perpetrate corporation information. Information that can benefit a user or organization can also be used against the user or the organization if it falls into wrong hands. Industrial espionage agents among highly competitive businesses are resorting to electronic means to stealing corporate information.

Encryption is the most pervasive solution for providing data confidentiality. Most data encryption software products install and store the encryption key which is used to encrypt, protect the data inside the same device where the data is stored. If the device is lost or hacked, both the encrypted data as well as the encryption key fall into the same hands and the data security is compromised accordingly.

Using an external portable token which is physically separated from the device storing the data, to store the encryption key for encrypting and accessing secured data, for example, from a virtual secure disk, is a preferred approach to securing sensitive data on a host computer, as it can separate the encryption key from the encrypted data. The communication link between the token and the host computer can be via any communication module or media such as radio frequency (RF) channels, or wired connections. The external portable token can be any peripheral device such as a USB flash drive, a mobile phone or even another computer. The host computer can be any computing machine such as a server, a desktop computer, a portable computer or smartphones. The host computer can contain a data security manager (DSM).

A password protection mechanism is incorporated together with the token to prevent unauthorized usage of the token. As an example, a user requesting to access the secured data is prompted to plug in his token and key in his password. The correctness of the password is checked. If the password is correct, the token (and hence the user) is allowed to access the secured data. A user is allowed access to the secure data only if the token is plugged in and the login password is correct. Data are encrypted using, for example, a symmetric key encryption algorithm.

While the above approach can secure sensitive data on a host computer, a problem exists in that a retail user in a consumer environment may forget his password associated with the portable token. While the password typically can be re-set by the manufacturer of the portable token, this approach does not offer a satisfactory solution because whenever a second party is involved in any security process, the chance of a security leakage becomes real. Similar problems also exist when the token is damaged, lost or stolen.

Embodiments of the present invention seek to provide a self-authentication system, device and method, preferably a self-authentication and recovery system, device and method, that enable the user or data owner to support themselves when such problems arise, without involving others.

SUMMARY

In accordance with a first aspect of the present invention, there is provided a self-authentication device for the user or owner of an electronic security device, wherein the self-authentication device is separate from the security device and is configured for connecting to a computing device via a first communication link for self-authentication processing, preferably for self-authentication and recovery processing.

In accordance with a second aspect of the present invention, there is provided a self-authentication method for the user or owner of an electronic security device, the method comprising connecting a self-authentication device separate from the security device to a computing device via a first communication link for self-authentication processing, preferably for self-authentication and recovery processing.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
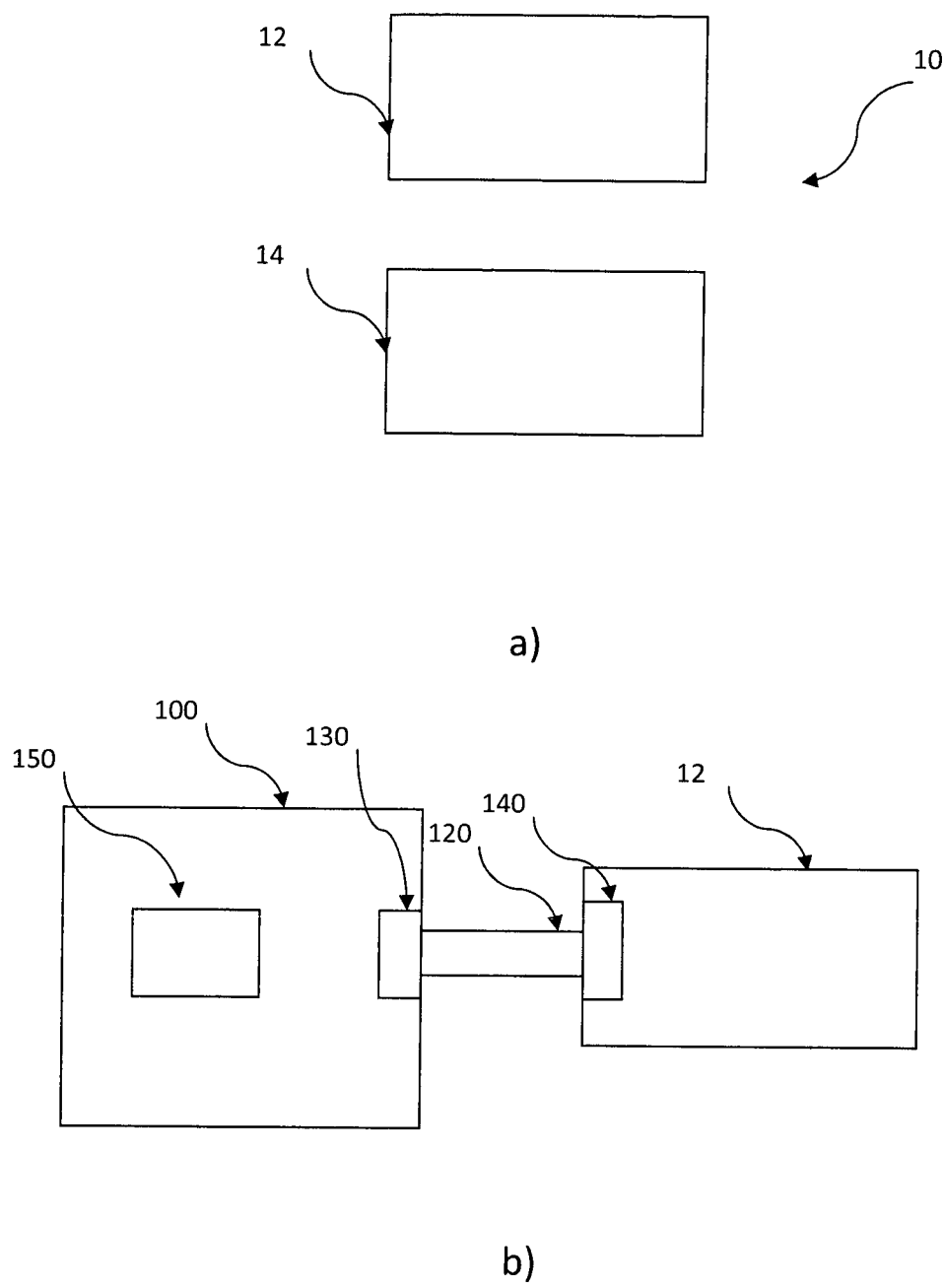
FIG. 1a) shows a schematic diagram illustrating an assembly for creating and accessing a secured virtual disk, according to an example embodiment.
FIG. 1b) shows a schematic diagram illustrating a host computer which interfaces with an external portable token of the assembly of FIG. 1a, according to an example embodiment.

Some portions of the description which follows are explicitly or implicitly presented in terms of algorithms and functional or symbolic representations of operations on data within a computer memory. These algorithmic descriptions and functional or symbolic representations are the means used by those skilled in the computer engineering arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses the algorithm of a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such, as magnetic or optical disks, memory chips, or other storage devices suitable for interfacing with a general purpose computer. The computer readable medium may also include a hard-wired medium such as exemplified in the internet system, or wireless medium (for example wi-fi, bluetooth device and the mobile telephone system). The computer program when loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an application specific integrated circuit (ASIC). Numerous other possibilities exist. Those skilled in the art will appreciate that the system can also be implemented as a combination of hardware and software modules.

General Description of Example Encryption System with Authentication Token

FIG. 1a) shows a schematic drawing illustrating an assembly 10 for use in encrypting and accessing secured data, for instance in a virtual secure disk, according to an example embodiment. The assembly 10 comprises a portable token 12 for connecting to a host computer via a first communication link for encrypting and accessing the secured data on the host computer, and a portable authentication device 14 associated with the token 12. The authentication device 14 is configured for connecting to a computing device via a second communication link for self-authentication and recovery processing.

FIG. 1b) illustrates a high-level schematic block diagram of a host computer 100 connected with the portable token 12 using communication link 120, according to an example embodiment. The communication link 120 represents the media through which data is communicated between the portable token 12 and the host computer 100 via the token's interface 140 and the computer's interface 130. The communication link includes, but is not limited to, any communication module or media such as radio frequency (RF) channels, or wired connections. The portable token 12 could be any peripheral device such as USB flash drive, a mobile phone or even another computer. The host computer 100 can be any computing machine such as a server, a desktop computer, a smart-phone, a notebook computer or portable computer. The host computer contains a data security manager (DSM) 150, which may be separately installed, e.g. from a CD-ROM or may be installed from the token 12 or through the internet.

Figure 2:
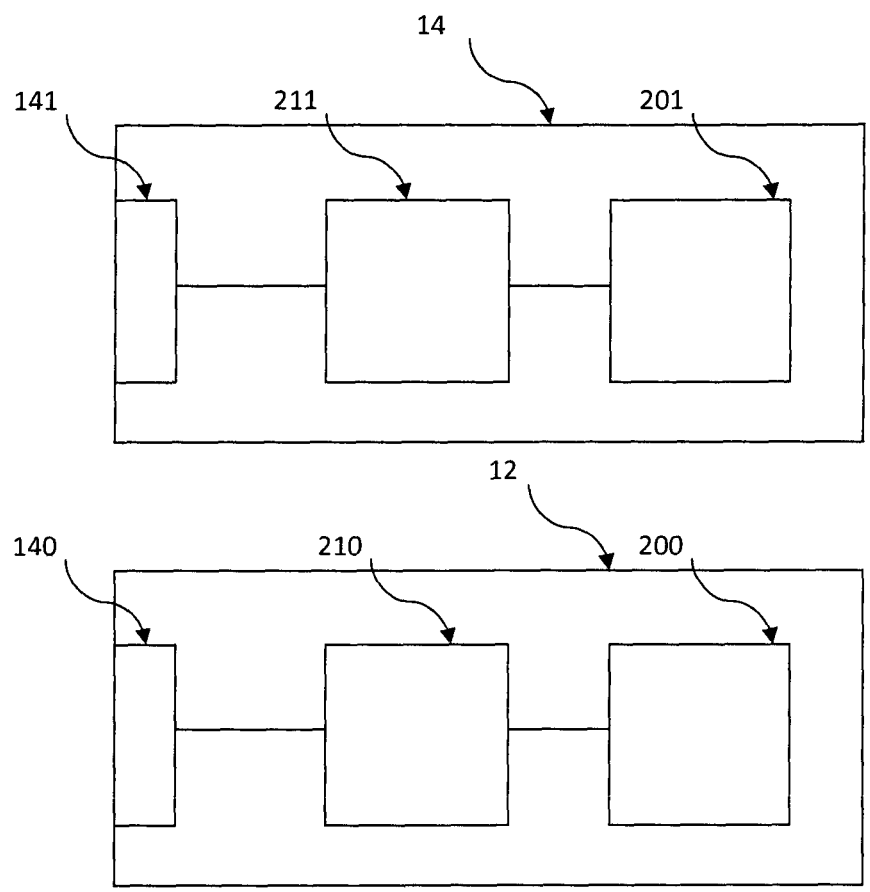
FIG. 2 shows a schematic diagram illustrating the configuration of the external portable token of the assembly of FIG. 1a, according to an example embodiment.

FIG. 2 is a high-level schematic block diagram showing some important components internal to the portable token 12 and the authentication device 14 according to an example embodiment. The token 12 and authentication device 14 each contains rewritable nonvolatile memory 200, 201 respectively, an embedded controller (EC) 210, 211 respectively, and the interface 140, 141 respectively to the computer.

The nonvolatile memory 200 contains data items such as password, counter value and token key and token batch key. The password is used to control user access to the token 12. The counter value can be a small positive integer used to control the number of consecutive failed password retries. In one embodiment, the token key is a random secret key used for file encryption and decryption under a symmetric key encryption algorithm. The token batch key is a random secret key which is used for token key or authentication key encryption and decryption. The nonvolatile memory 201 contains data items such as an authentication key.

Returning to FIG. 1b), before a token 12 is used on a computer system, the DSM 150 needs to be installed and the token 12 needs to be initialised. The token 12 is connected to the computer 100 and a user password for the token 12 is entered. The token key is then generated. Alternatively the token key can be pre-installed at the factory.

Matching Keys

The authentication device 14 (FIG. 1a)) has a unique matching authentication key to the token key. In one embodiment, "matching" means "equal", but it is noted that, in different embodiments "matching" can include that one key can be matched to the other using for example an algorithm for transforming one key into the other. The unique authentication key for the authentication device 14 can be pre-stored in the authentication device 14 during production or can be generated and stored during user installation.

Example: Matching Using Separate Unique Identifiers

The association or pairing of the token 12 and the associated authentication device 14 may be implemented using unique identifiers in the token 12 and in the authentication device 14 respectively. The pair of unique identifiers can be "equal", but may alternatively be configured such that one unique identifier can be matched to the other using for example an algorithm for transforming one unique identifier into the other. The pair of unique identifiers may be pre-stored during production or can be generated and stored during user installation.

In example embodiments, the association between the token 12 and the authentication device 14 is unique, i.e. a one-to-one association only between the one token 12 and the one authentication device 14 is created.

Example: Matching Using Many-to-One Identifiers

In another example embodiment, the association between the token 12 and the authentication device 14 is a many-to-one association between a plurality of tokens 12 and the one authentication device 14.

Access Control

The DSM 150 performs access control to secured data for instance in a virtual secure disk based on four events: token plug-in, token removal, user login and user logout. A user is allowed access to the secured data only if the token 12 is plugged in and the login password is correct. Otherwise, the secured data is not accessible. During user access to the secured data, the DSM 150 constantly detects if the token 12 is present. If DSM 150 detects that the token 12 is removed from the host computer, the user is immediately denied access to the secured data. Accessibility is only restored upon plug-in of the token 12 and successful user log-in.

Data are encrypted using a symmetric key encryption algorithm in one example embodiment.

Password Reset

In the following, it will be described how the authentication device 14 can advantageously be used for authentication processing prior to resetting the password on the token 12, for example for regaining full access to the secured data if the user has forgotten the original password, in a first scenario.

FIG. 3*a*) shows a schematic diagram illustrating authentication processing using the token 12 and the authentication device 14. In one example, the user presents the token 12 together with the authentication device 14 to a computer 300 at, for example, a service center, a station of the manufacturer, an internet web interface of the manufacturer or an authorized dealer. This computer 300 may also be the user's host computer. The authentication device 14 and the token 12 are connected to the computer 300 via respective communication links 304, 302. The token 12 and the authentication device 14 may be simultaneously connected to the computer 300, or may be connected in sequence, for example where only one communication interface for connecting to the computer 300 may be available. An authentication manager (AM) 306 is running on the computer 300.

Example: Matching Operation Before Password Reset

As illustrated in FIG. 3*b*), the user requests to "reset password" at step 350, for example from a menu list presented on the computer screen under the control of the AM 306 running on the computer 300, in response to the plug-in of the token 12 and the authentication device 14. Upon confirmation of the request, the authentication device 14 encrypts its authentication key at step 352, and sends the encrypted authentication key to the token 12, for example via the AM 306, at step 354. Methods such as secret key cryptography or other suitable methods may be used in example embodiments. It is noted that therefore, the AM 306 in this example embodiment advantageously cannot "see" the actual authentication key.

At step 356, the token 12 then decrypts the encrypted authentication key received from the authentication device 14, to check the authentication key at step 358. If the authentication key "matches" the token key stored in the token 12, then the match between the authentication device 14 and the token 12 is successfully established in this example embodiment. The successful establishment of the match is communicated to the AM 306. In one alternative embodiment, the token 12 can perform encryption of its token key and send the encrypted token key to the authentication device 14 for decryption and checking of the match. As will be appreciated by a person skilled in the art, the final result, i.e. that the match is checked, can advantageously be the same in such an alternative embodiment.

The AM 306 will then allow the user to re-input a new password for the token 12. The AM 306 will replace the token's old password with the new password, at step 360 or will reset the password to a default password.

Accordingly, only if a person presents the "matching" token 12 and authentication device 14, will a reset of the password be allowed. This can advantageously overcome the problems associated with existing solutions described in the background section above. In an alternative embodiment, the AM 306 parses the authentication device 14 and the token 12 to authenticate an association there between. In other words, the AM 306 automatically determines whether the token 12 and the authentication device 14 "belong together". If they do, this serves as evidence that the person presenting the token is the authorized person/owner of the token 12. If not, re-setting of the password will be refused.

In one example, the token 12 and authentication device 14 which belong together both contain an identical unique data string, as the token key and matching authentication key respectively. The AM 306 will compare the data strings in the token 12 and in the authentication device 14. When the two strings are the same, a match is established. In another example, the data strings in the token 12 and authentication device 14 that belong together could be different. In this case, the AM 306 will use an authentication algorithm to process the two data strings to establish whether they are matched to each other. Method such as secret key cryptography or other suitable methods may be used in example embodiments.

If the authentication of the association between the token 12 and the authentication device 14 is successful, the AM 306, either automatically or prompted by user input, executes a password re-setting operation.

Figure 3:
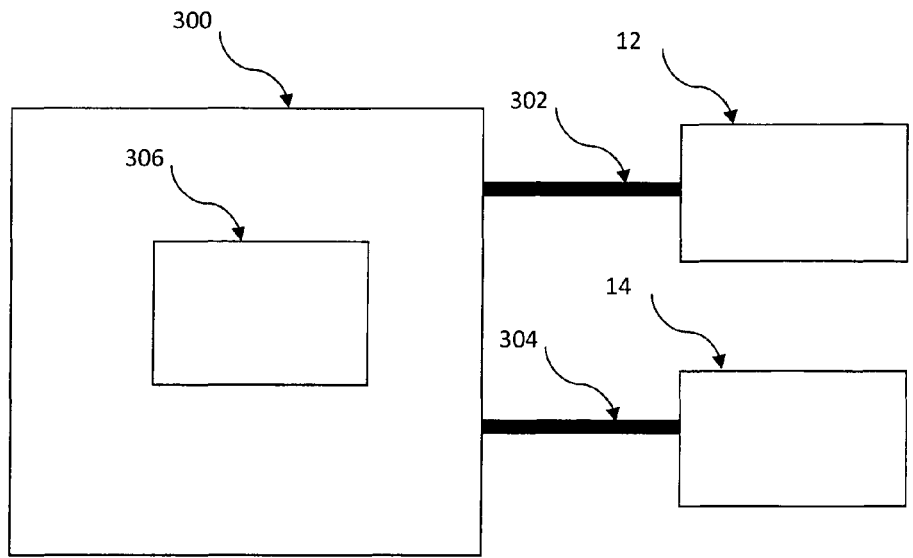
FIG. 3a) shows a schematic diagram illustrating authentication processing for re-setting the token password, according to an example embodiment.
FIG. 3b) shows a flowchart illustrating authentication processing for re-setting the token password, according to an example embodiment.
Figure 3:
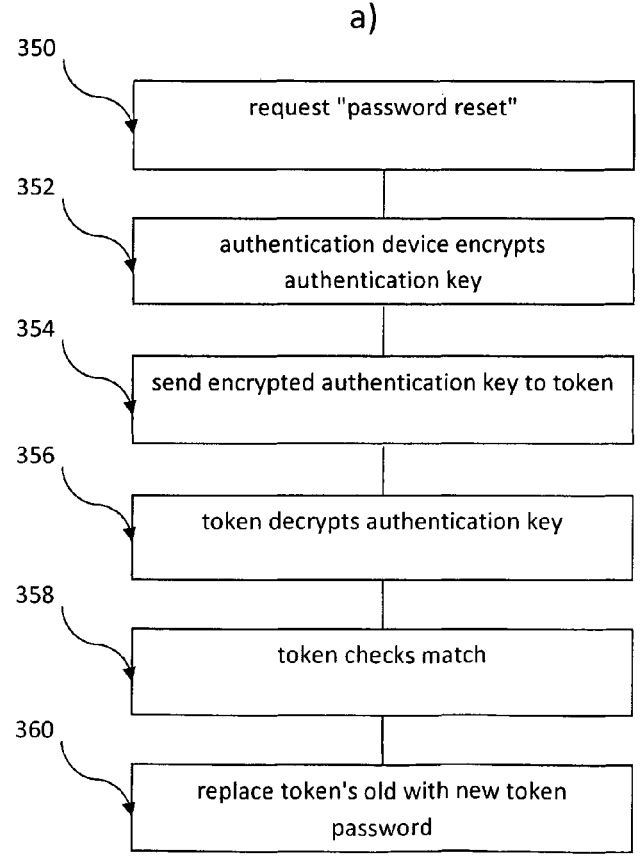

As mentioned before, unique identifiers stored in the token 12 and the authentication device 14 respectively may be used in the checking of the match between the token 12 and the authentication device 14, in the same manner as described for the key matching above with reference to FIG. 3.

Duplicate Encryption Token

In the following, it will be described how the authentication device 14 can advantageously be used as evidence that the person is "authorized" prior to creating a duplicate token of the token 12.

Figure 4:
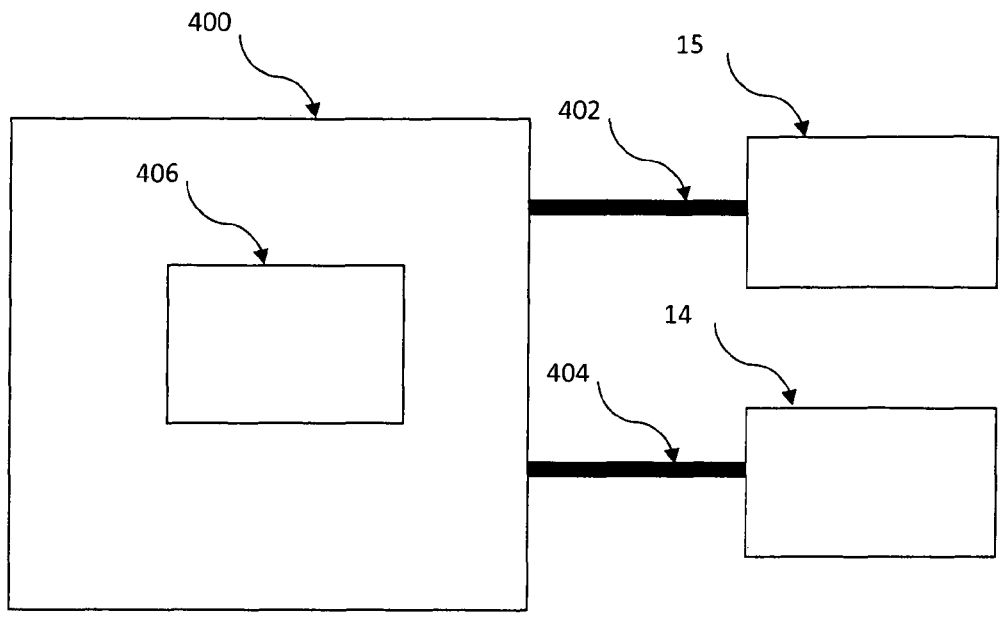
FIG. 4a) shows a schematic diagram illustrating authentication processing for creating a duplicate token for replacement of a lost, damaged or stolen token, according to an example embodiment.
FIG. 4b) shows a flowchart illustrating authentication processing for creating a duplicate token for replacement of a lost, damaged or stolen token, according to an example embodiment.
Figure 4:
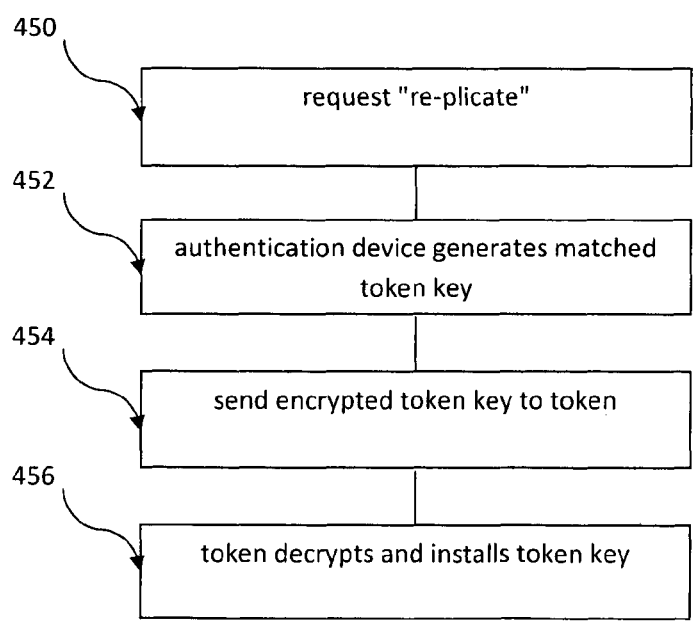

With reference to FIG. 4a), in one example, the user presents a "blank" token 15 together with the authentication device 14 to a computer 400 at, for example, a service center, a station of the manufacturer, an internet web interface of the manufacturer or an authorized dealer. A "blank" token 15 is a token which is not associated with a security token (yet), and for example, does not contain the unique token key, and which allows a new unique token key to be placed inside. It is noted that a normal token can also be converted to a "blank" token by stripping away the token key. For example, the user plugs in the token, inputs the password to show he is the owner, and then remove or replace the token key. Accordingly, a normal token can be used instead of a "blank" token 15 in a different embodiment.

The authentication device 14 and the token 15 are connected to the computing device 400 via respective communication links 404, 402. The token 15 and the authentication device 14 may be simultaneously connected to the computer 400, or may be connected in sequence, for example where only one communication interface for connecting to the computer 400 may be available.

As illustrated in FIG. 4b), the user chooses to create a duplicate token at step 450, for example from a menu list presented on the computer screen under the control of the AM 406 running on the computer 800, in response to the plug-in of the blank token 15 and the authentication device 14. Upon confirmation of the request, the authentication device 14 generates the matched token key from its authentication key and encrypts the token key at step 452. Methods such as secret key cryptography or other suitable methods may be used in example embodiments.

The encrypted token key is sent to the "blank" token 15, for example via the AM 406, at step 454. The token 15 decrypts the token key received from the authentication device 14 and installs the decrypted token key, at step 456. Accordingly, the "blank" token 15 is now converted into a token that is matched to, i.e. associated with, the authentication device 14.

In an alternative embodiment, the AM 406 on the computer 400 parses the authentication device 14 and generates the token key for the token 15. This token key is matched to the authentication device's 14 authentication key, is then entered into the token 15 by the AM 406. The token 15 and the authentication device 14 now "belong together", i.e. become a matched or associated pair. In this example, the creation of a duplicate token is for the replacement of a damaged token. It may be desirable in this case for the AM 406 to be hosted in an authorized environment.

Where the authentication device 14 also contains a unique identifier for the association with a token, the authentication device 14, or the AM 406 in the alternative embodiment, generate a matching unique identifier for storing in the token 15 in the same way as the token key.

In the examples described above with reference to FIGS. 3 and 4, it is assumed that the authentication device 14 is kept safe by the user/owner of the token 12, as it is not required for normal use. Accordingly, being in possession of the authentication device 14 can be considered as evidence that the person is "authorized".

Re-Encrypt with New Key

Example: Authentication Device Re-Encrypts Data

In other instances, the user may desire to re-encrypt his secured data which have been encrypted by a token that has been lost. In this next example, the process to re-encrypt the secured data so that a lost token no longer has accessibility to these data is described with reference to FIGS. 5a) and b), according to an embodiment.

Figure 5:
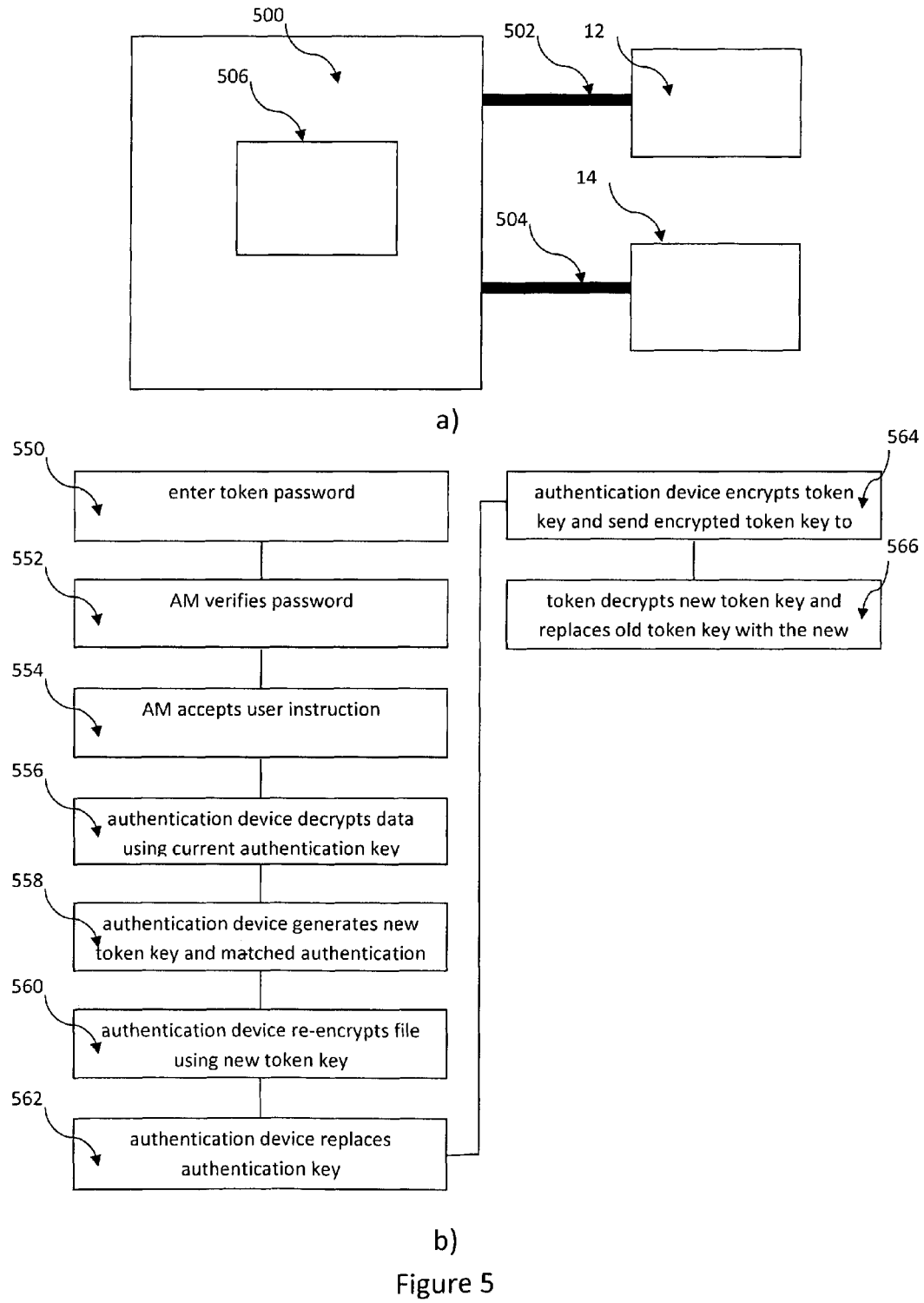
FIG. 5a) shows a schematic diagram illustrating re-encrypting access to secured data files, according to an example embodiment.
FIG. 5b) shows a flowchart illustrating re-encrypting access to secured data files, according to an example embodiment.

As shown in FIG. 5a), the user connects the authentication device 14 and the token 12 to e.g. the host computer 500, via respective communication links 504, 502. This token 12 may be a new replacement token for a lost token. As illustrated in FIG. 5b) the user enters the token password at step 550, and the password is checked and verified to be correct at step 552.

The AM 506 then accepts the user instruction to change the authentication key and the token key and to re-encrypt all the secured files with the new token key, at step 554.

At step 556, the secured data are decrypted by the authentication device 14 using the current authentication key. The authentication device 14 then generates a new token key and matched authentication key at step 558. The authentication device 14 re-encrypts the data using the new token key at step 560.

The authentication device 14 replaces its old authentication key with the newly generated authentication key at step 562. The new token key is encrypted by the authentication device and sent to the token 12, for example via the AM 506, at step 564. The token 12 decrypts the received new token key, and replaces the old token key with the new token key at step 566.

The token key and the authentication key have now been replaced with a newer version and the secured files have been re-encrypted with the new key. Accordingly, the lost or stolen key, for which token 12 is the replacement for example, will advantageously no longer be able to open the secured files.

Example: New Token Re-Encrypts Data

In one alternative embodiment, the token 12 can perform the key replacement and re-encryption functions of the authentication device 14. After the data is decrypted by the authentication device 14, replacement token 12 then re-encrypts the data with the new token key. After that, the Token 12 will encrypt its new token key and send it to authentication device 14. The authentication device 14 decrypts it and generates and installs a new authentication key that matches the new token key. As will be appreciated by a person skilled in the art, the final result, i.e. that the token key and the authentication key have been replaced with a newer version and the secured files have been re-encrypted with the new key, can advantageously be the same in such an alternative embodiment.

Example: Authorization Manager Re-Encrypts Data

In an alternative embodiment, the user instructs the AM 506 to re-encrypt his secured data files, the AM 506 will generate a new authentication key for the authentication device 14 and a new matching token key for its matched token 12, in this example embodiment. Using the old authentication key, the AM 506 will decrypt the secured data. It will then re-encrypt the decrypted data using the new token key. Therefore, the lost or stolen token now cannot access these data with its old token key. The AM 506 will write the new authentication key into the authentication device 14 to replace the old one, and the new token key into the token 12 to replace the old one. The token 12 will now be able the access the secured data, using the new token key.

Read Only Access

In the following, it will be described how the authentication device 14 can advantageously be used for read-only access to the secured data with or without requiring a password according to an example embodiment.

Figure 6:
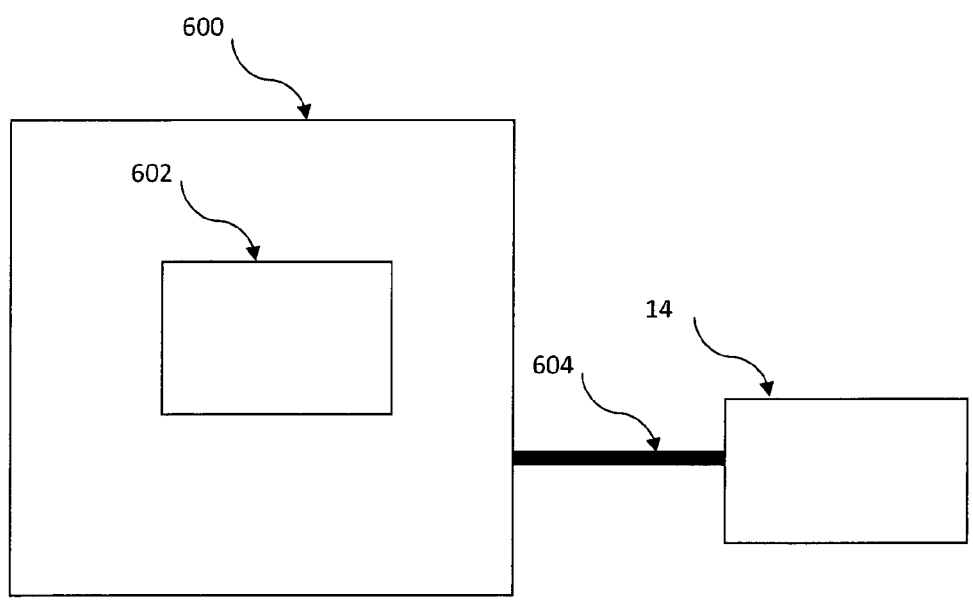
FIG. 6 shows a schematic diagram illustrating read-only access to the secured virtual disk, according to an example embodiment.

With reference to FIG. 6, if the authentication device 14 is connected to the host computer 600 via communication link 604, the DSM 602 performs read-only access control to the secured data based on authentication device 14 connection and authentication device 14 removal. To enable access, the DSM 602 sends the encrypted data to the authentication device 14 to decrypt the data. During user read-only access to the secured data, the DSM 602 constantly detects if the authentication device 14 is present. If DSM 602 detects that the authentication device 14 is removed from the host computer 600, the user is immediately denied access to the secured data.

In an alternative embodiment, the DSM 602 reads and parses the authentication key from the authentication device 14. With the authentication key, the DSM 602 can derive the token key to decrypt the secured data. In one embodiment, the authentication key from the authentication device 14 is equal to the token key. A user is allowed read-only access to the secured data if the authentication device 14 is connected. During user read-only access to the secured data, the DSM 602 constantly detects if the authentication device 14 is present. If DSM 602 detects that the authentication device 14 is removed from the host computer 600, the user is immediately denied access to the secured data.

In that way, the example embodiments advantageously provide that, should a user forget the password or lose the token, the user is still able to read the data using the authentication device 14.

Example Implementations and Variations

In one embodiment, a self-authentication device for authenticating the user or owner of an electronic security device is provided, wherein the self-authentication recovery device is separate from the security device and is configured for connecting to a computing device via a first communication link for authentication processing, preferably for authentication and recovery processing. The authentication processing can comprise authenticating an association between the security device and the self-authentication recovery device. The authentication processing can comprise matching a first key and/or a first unique identifier stored in the self-authentication device with a second key and/or a second unique identifier stored in the security device.

In one embodiment, the self-authentication device is configured for generating a third key and/or a third unique identifier for configuring another security device as associated with the self-authentication device.

The self-authentication device can be configured for enabling resetting a password stored in the security device upon successful authentication.

The self-authentication device can further be configured for connecting to a host computer via a second communication link, for reading data stored for example in a virtual secured disk on the host computer. The self-authentication device can further be configured for connecting to the host computer via the second communication link, for reading data stored for example in the virtual secured disk on the host computer with or without requiring a password.

In one embodiment the self-authentication device is configured for decrypting data stored for example in a virtual secured disk on a host computer, generating a fourth key, and encrypting the data using the fourth key.

The computing device can be a host computer for the security device or a computing device residing in one or more of a group consisting of a service center, a station of the manufacturer, an internet web interface of the manufacturer or an authorized dealer. The security device can be a data encryption token.

In one embodiment, a self-authentication method for authenticating the user or owner of an electronic security device is provided, the method comprising connecting a self-authentication device separate from the security device to a computing device via a first communication link for authentication processing, preferably for authentication and recovery processing. The method can further comprise connecting the security device to the computing device via a second communication link, for the authentication processing. The authentication processing can comprise authenticating an association between the security device and the self-authentication device. The authentication processing can comprise matching a first key and/or a first unique identifier stored in the self-authentication device with a second key and/or a second unique identifier stored in the security device.

In one embodiment, the method can further comprise resetting a user password stored in the security device upon successful authentication of the association between the self-authentication device and the security device.

The authentication processing can comprise obtaining a third key and/or a third unique identifier from the self-authentication device for configuring an un-associated security device as associated with the self-authentication device.

The method can further comprise connecting the self-authentication device to a host computer via a third communication link for reading data stored for example in a virtual secured disk on the host computer. The reading of the data stored for example in the virtual secured disk on the host computer is with or without requiring a password.

In one embodiment, the method further comprises decrypting data stored for example in a virtual secured disc of a host computer; encrypting the decrypted data using a new key; and storing the new key in the token and a matching authentication key in the self-authentication device.

The security device can be a data encryption token.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features, in particular any combination of features in the patent claims, even if the feature or combination of features is not explicitly specified in the patent claims or the present embodiments.

For example, the functionality of the DSM and the AM described in the example embodiments may be implemented in one Security Control Manager (SCM) in different embodiments.

Also, while the embodiments have been described in the context of a security token for data encryption, it will be appreciated that the present invention can be applied to different electronic security devices such as electronic secure access cards to buildings or secure areas.

As another example, while in the described embodiments the security token is implemented as a single portable device, it will be appreciated that the present invention can be used in conjunction with different implementations of a security token. For example, the security token can be implemented using one or more interacting devices, which may interact wirelessly and/or wired to perform the desired security functionality. The devices may include one or more of a peripheral device such as a USB flash drive, a mobile phone or any other computing machine/device.

Also, while in the described embodiments the security token is implemented for data encryption using a virtual disk, it will be appreciated that in different embodiments File Encryption, Folder Encryption or Whole Disk Encryption etc. can be implemented.

The invention claimed is:

1. A self-authentication device for the user or owner of an electronic security device, wherein the self-authentication device is separate from the security device and is configured for connecting to a computing device via a first communication link for self-authentication processing, and wherein the self-authentication device is configured for enabling resetting a user password stored in the security device upon successful self-authentication without requiring user-input of an authorization password or pin.

2. The self-authentication device as claimed in claim 1, wherein the authentication processing comprises matching a first key and/or a first unique identifier stored in the self-authentication device with a second key and/or a second unique identifier stored in the security device.

3. The self-authentication device as claimed in claim 1, wherein the self-authentication device is configured for generating a third key and/or a third unique identifier for configuring another security device as associated with the self-authentication device.

4. The self-authentication device as claimed in claim 1, wherein the self-authentication device is further configured for connecting to a host computer via a second communication link, for reading data stored for example in a virtual secured disk on the host computer.

5. The self-authentication device as claimed in claim 4, wherein the self-authentication device is further configured for connecting to the host computer via the second communication link, for reading data stored for example in the virtual secured disk on the host computer without requiring a password.

6. The self-authentication device as claimed in claim 1 wherein the self-authentication device is configured for decrypting data stored for example in a virtual secured disk on a host computer, generating a fourth key, and encrypting the data using the fourth key.

7. The self-authentication device as claimed in claim 1, wherein the security device is a data encryption token.

8. A self-authentication method for the user or owner of an electronic security device, the method comprising connecting an self-authentication device separate from the security device to a computing device via a first communication link for self-authentication processing, and resetting a user password stored in the security device upon successful authentication of the association between the self-authentication device and the security device without requiring user-input of an authorization password or pin.

9. The method as claimed in claim 8, wherein the authentication processing comprises authenticating an association between the security device and the self-authentication device.

10. The method as claimed in claim 9, wherein the authentication processing comprises matching a first key and/or a first unique identifier stored in the self-authentication device with a second key and/or a second unique identifier stored in the security device.

11. The method as claimed in claim 8, wherein the authentication processing comprises obtaining a third key and/or a third unique identifier from the self-authentication device for configuring an un-associated security device as associated with the self-authentication device.

12. The method as claimed in claim 8, further comprising connecting the self-authentication device to a host computer via a third communication link for reading data stored for example in a virtual secured disk on the host computer.

13. The method as claimed in claim 12, wherein the reading of the data stored for example in the virtual secured disk on the host computer is without requiring a password.

14. The method as claimed in claim 8, further comprising:
   decrypting data stored for example in a virtual secured disk of a host computer;
   encrypting the decrypted data using a new key; and
   storing the new key in the security device and a matching authentication key in the self-authentication device.

15. The method as claimed in claim 8, wherein the security device is a data encryption token.

* * * * *